L. WIRTHLIN.
Machines for Dressing and Crozing Barrels.

No. 154,997.          Patented Sept. 15, 1874.

Witnesses:
J. W. Herthel.
Chas. F. Meisner.

Inventor
Louis Wirthlin
per Herthel & Co
attys.

UNITED STATES PATENT OFFICE.

LOUIS WIRTHLIN, OF ST. LOUIS, MISSOURI.

IMPROVEMENT IN MACHINES FOR DRESSING AND CROZING BARRELS.

Specification forming part of Letters Patent No. 154,997, dated September 15, 1874; application filed February 17, 1874.

*To all whom it may concern:*

Be it known that I, LOUIS WIRTHLIN, of St. Louis, county of St. Louis and State of Missouri, have made a certain new and useful Improved Machine for Making Kegs, &c.; and I do hereby declare that the following is a full and true description thereof, reference being had to the accompanying drawings, and to the letters of reference thereon.

The nature of this invention consists in certain improved combination of parts, which will hereinafter more fully appear.

Figure 1:
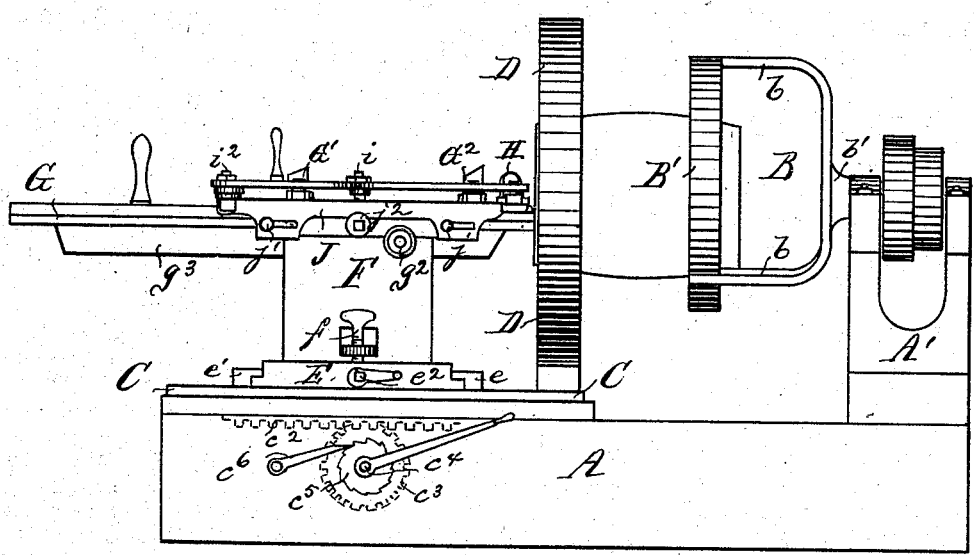
Figure 2:
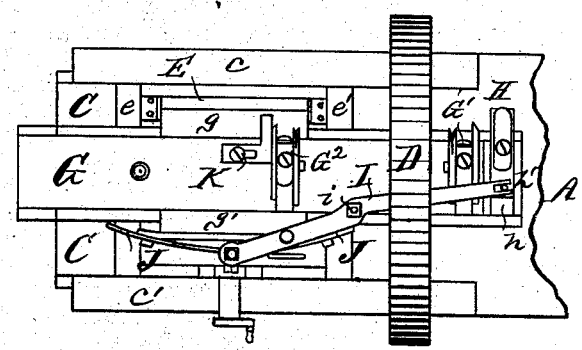
Figure 4:
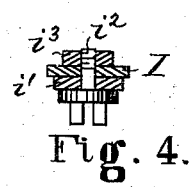
Figure 3:
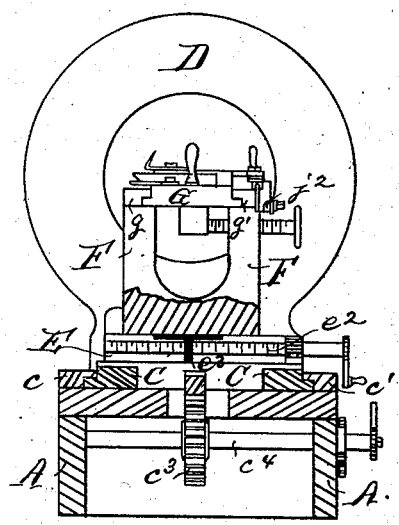

Of the drawing, Figure 1 is a side elevation; Fig. 2, a part top plan; Fig. 3, an end sectional elevation; Fig. 4, a detail enlarged section of turn-bolt connection.

A is the bed of the machine. At one end of the bed A is a standard, A', which carries the outer chuck B. The chuck B consists of a collar, B', secured to branch arms $b$, which form part of the arbor $b'$, arranged to turn in proper journal-bearings of the standard A'. On the arbor $b'$ are fast and loose belt-pulleys, that connect to power-source. To the collar B' the various rings adapted to receive the different kegs are bolted, as ordinary. The object of the chuck part B is to hold and chuck one head or end of the keg, and also revolve the keg when ready to be dressed, crozed, and chamfered. On the bed A of the machine I provide a horizontal main table, C. The table C is seated to slide in the dovetailed side guides $c$ $c^1$ of the bed A. To operate the table C to slide horizontally, the same is provided with a running rack, $c^2$, fitted to mesh with a gear-wheel, $c^3$, on the transverse shaft $c^4$, which turns in the bed A, as shown in Figs. 1 and 3, the bed-frame A being properly slotted the length of the slide travel to allow this gearing action to take place. Near one end the shaft $c^4$ has a ratchet-wheel, $c^5$, fitted to engage which is a pawl, $c^6$, and by means whereof the sliding table C can be estopped and secured in position required. To one end of the slide-table C I secure the head-collar D, that constitutes the other part of the chuck; hence, the object of thus combining the head-collar D with slide-table C, and imparting to said parts a horizontal slide-motion, is to cause said head-collar D to chuck the opposite end of the keg, as well as to slide and secure said head-collar in position for all-sized kegs. The head-collar D is countersunk to receive the center ring, which is provided with rollers so as to turn with keg when same is chucked, said center ring being secured to head-collar by an outer guide-ring, which is bolted to it; also, I bolt to the head-collar the ring adapted to receive the different diameters or heads of kegs. The operation of the slide-table C is done by a hand-lever attached to end of transverse shaft $c^4$. The slide-table C further supports the transverse slide E. This I seat to slide also in dovetailed side guides $e$ $e^1$, which are bolted top of the table C. To operate the slide E transversely I provide a screw-shaft, $e^2$, turning in proper journal-bearings secured to table C. The screw-shaft $e^2$ engages a nut, $e^3$, Fig. 3, at bottom of the transverse table E. By operating, therefore, screw-shaft, $e^2$, a transverse slide-motion is imparted to said table E. Top of the transverse table E I firmly secure the rest F by its side screws $f$ passing through proper bearings, so as to engage the top of the said table E. Top of the rest F I provide the hand-slide G. This is operated to slide horizontally in the dovetail side guides $g$ $g^1$, which are bolted top of said rest. (See Figs. 2 and 3.) The top slide G, by its handle, is operated to slide through the keg, and can be secured from further operation by a side screw, $g^2$, passing through the hollow of the rest F, and made to engage the offset $g^3$, which forms part of the under side of said hand-slide G. (See Fig. 1.) The hand-slide G I provide with the necessary tools that perform the howeling, crozing, and chamfering of the keg, said tools, as shown at $G^1$ $G^2$, Fig. 3, being so arranged and secured on the slide as to perform their work at both heads of the keg at same time. H represents the bilge-tool. This I secure adjustably by means of a screw to a follower, $h$, which slides transversely in proper guides attached to the end of the hand-slide, as shown in Fig. 2. To operate the follower $h$, the same has a projecting pin, $h'$, which engages the open slotted bearing at outer end of the feed-bar I, which is of the constructive shape shown in Fig. 2, and having its fulcrum at $i$. The inner end of feed-bar I has secured thereto a collar, $i^1$, in which turns a turn-bolt, $i^2$, secured at top by a nut, $i^3$, and having its lower end slotted, as shown more clearly in Fig. 4, the slotted lower end of turn-bolt $i^2$ being to engage a curved guide, J, which is of the curved constructive shape indicated in Figs. 1, 2, and being secured adjustably, by slots and bolts $j\, j^1$, to the rest F, the object of thus connecting the feed-bar I, by means of the turn-bolt $i^2$, to the curved guide J being to cause the bilge-tool H to operate in curvature line according to the bulge of the keg, and smoothly turn same inside, when the hand-slide G is operated to cause said tool to pass through the keg. The adjustable feature of the slots and bolts $j\, j^1$ is to enable the curved guide J to be set according to the various kegs operated upon. Further, the curvature of the guide J can be increased or diminished as the bilge of the kegs requires. This is done by operating a screw, $j^2$, which passes through the guide J to engage the rest. By fastening said screw, the guide J is sprung inward, which decreases its curvature, and, by loosening said screw, said guide springs outwardly, increasing its curvature. It will be noticed that as the rest F, hand-slide G, together with the operating parts, are all mounted upon the transverse slide-table E, by operating same to slide transversely, all said parts are at same time positioned transversely, as required to accomplish the operation of dressing different sizes of kegs. K is an ordinary gage, with which the hand-slide G is provided.

The operation of the machine is therefore as follows: The keg to be dressed is placed with one head in the chuck part B. The main slide C is operated by its shaft $c^2$, so as to bring its chuck part D to chuck the opposite head of the keg. The transverse slide E, with its mounted parts, is next adjusted according to the bilge of the keg. This done, and while the keg is revolving, the operator slides the hand-slide G so that its bilge-tool H passes through keg, and smooths or turns out its bilge. The hand-slide G being properly gaged to suit the tools to the heads of the keg, the operation of chamfering, howeling, and crozing is done at both ends at the same time. This operation finishes the keg, and the hand-slide G is withdrawn clear of the keg, and also the lower table C, so as to free keg from the chuck, and the repetition of operation aforesaid commences.

What I claim is—

1. The transverse sliding table E, operated by screw-shaft $e^2$, in combination with main sliding table C, as and for the purpose set forth.

2. The curved guide J, its slots and screws $j\, j^1$, in combination with rest F, as and for the purpose set forth.

3. The combination of hand-slide G, tools $G^1$ $G^2$, bilge-tool H, feed-bar I, turn-bolt $i^2$, curved guide J, rest F, transverse slide E, and main slide-table C, to operate as herein shown and described, as and for the purpose set forth.

In testimony of said invention I have hereunto set my hand.

LOUIS WIRTHLIN.

Witnesses:
WILLIAM W. HERTHEL,
CHAS. F. MEISNER.